US006755745B1

(12) United States Patent
Seto et al.

(10) Patent No.: US 6,755,745 B1
(45) Date of Patent: Jun. 29, 2004

(54) DISPLAY CONTROL WITH FEWER AMOUNTS OF DATA IN GAME SYSTEM

(75) Inventors: Takeshi Seto, Nagoya (JP); Kuniharu Suzuki, Nagoya (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/323,770

(22) Filed: Jun. 1, 1999

(30) Foreign Application Priority Data

Jun. 3, 1999 (JP) .......................................... 10-154566

(51) Int. Cl.[7] .......................... A63F 13/00; A63F 9/24; G06F 17/00; G06F 19/00
(52) U.S. Cl. ................................ 463/43; 463/1; 463/2; 463/4; 463/44; 345/440; 345/561; 345/569; 345/672; 345/682; 345/684
(58) Field of Search ............................... 463/1, 2, 6, 7, 463/29, 30, 31, 32, 33, 34, 40, 41, 42, 43; 345/418, 428, 429, 433, 440, 473, 113, 114, 118, 121, 115, 133

(56) References Cited

U.S. PATENT DOCUMENTS

| 4,296,930 A | * | 10/1981 | Frederiksen | ................ | 463/31 |
| 4,401,304 A | * | 8/1983 | Hamano | ...................... | 463/3 |
| 4,521,020 A | * | 6/1985 | Uemura et al. | ....... | 273/85 G X |
| 4,672,541 A | | 6/1987 | Bromley et al. | | |
| 5,459,830 A | * | 10/1995 | Ohba et al. | ................ | 395/152 |
| 5,601,487 A | * | 2/1997 | Oshima et al. | ............. | 463/4 X |
| 5,680,533 A | * | 10/1997 | Yamato et al. | .......... | 395/173 X |
| 5,706,417 A | * | 1/1998 | Adelson | ................ | 395/129 X |
| 5,767,845 A | * | 6/1998 | Oashi et al. | ............ | 345/302 X |
| 5,808,591 A | * | 9/1998 | Mantani | ................... | 345/82 X |
| 5,831,590 A | * | 11/1998 | Ikedo | ...................... | 345/113 X |
| 5,850,230 A | * | 12/1998 | San et al. | ............... | 345/501 X |
| 5,867,166 A | * | 2/1999 | Myhrvold et al. | ........ | 345/419 |
| 5,894,300 A | * | 4/1999 | Takizawa | ................ | 345/115 X |
| 5,990,860 A | * | 11/1999 | Takeuchi | ................ | 345/115 X |
| 6,123,619 A | * | 9/2000 | Tokita et al. | ............ | 463/43 X |
| 6,130,661 A | * | 10/2000 | Ilbery | ..................... | 345/147 X |
| 6,163,323 A | * | 12/2000 | Intriligator | .............. | 345/473 X |
| 6,192,393 B1 | * | 2/2001 | Tarantino et al. | ........ | 709/203 X |
| 6,195,078 B1 | * | 2/2001 | Dinwiddie et al. | ...... | 345/114 X |
| 6,203,425 B1 | * | 3/2001 | Hayashi | ..................... | 463/1 X |

FOREIGN PATENT DOCUMENTS

| EP | 0428164 | | 5/1991 |
| GB | 2163929 A | * | 3/1986 |

OTHER PUBLICATIONS

Pabouctsidis C: "The coding of graphics animation in a videotex terminal" IEEE Transactions on Consumer Electronics, US, IEEE Inc. New York, vol. CE–30, No. 3 Jun. 6, 1984, pp. 421–428, ISSN: 0098–3063.

* cited by examiner

*Primary Examiner*—Teresa Walberg
*Assistant Examiner*—Binh-An D. Nguyen
(74) *Attorney, Agent, or Firm*—Jordan and Hamburg LLP

(57) ABSTRACT

By using a unique display control technique, game images are provided, in which characters can be displayed in different poses with a limited-capacity memory area. Both image data corresponding to each of a plurality of blocks obtained by dividing a character to be displayed in a game image and further image data for representing different pictures in connection with at least part of the blocks are prepared. And the display pose of the character displayed in the game image is changed by switching a combination of the prepared image data. By way of example, color of at least part of the character displayed in the game image is changed on the basis of the combination of the same image data, thereby representing a plurality of types of characters. The color within the block mapped uppermost in the game image among the blocks constituting the character is kept unchanged regardless of changing of the color with respect to the remaining blocks.

18 Claims, 12 Drawing Sheets

FIG. 7

| POSE | ADDRESS | COORDINATE |
|------|---------|------------|
| 0 0  | 0 0     | x1, y1     |
|      | 0 1     | x2, y2     |
|      | 0 0     | x3, y3     |
|      | 0 2     | x4, y4     |
|      | 0 3     | x5, y5     |
|      | 0 4     | x6, y6     |
| 0 1  | 0 5     | x1, y1     |
|      | 0 6     | x2, y2     |
|      | 0 7     | x3, y3     |
|      | 0 8     | x4, y4     |
|      | 0 9     | x5, y5     |
| 0 2  | 0 5     | x1, y1     |
|      | 0 A     | x2, y2     |
|      | 0 B     | x3, y3     |
|      | 0 C     | x4, y4     |
|      | 0 D     | x5, y5     |

IMAGE DATA OF CENTRAL FIELD

IMAGE DATA OF RIGHT FIELD

IMAGE DATA OF LEFT FIELD

FIG.12A

| CHARACTER NO. | POSE | DISPLAY POSITION | CONVERSION OF GRADATIONS |
|---|---|---|---|
| 1 | 00 | x01,y01 | 0 |
| 2 | 04 | x02,y02 | 1 |
| 3 | 02 | x03,y03 | 1 |
| | | | |

FIG.12B

| DATA NO. | ADDRESS | CONVERSION OF GRADATIONS | COORDINATE |
|---|---|---|---|
| 00 | 00 | 0 | x11,y11 |
| 01 | 01 | 0 | x12,y12 |
| 02 | 00 | 0 | x13,y13 |
| 03 | 02 | 0 | x14,y14 |
| 04 | 03 | 0 | x15,y15 |
| 05 | 04 | 0 | x16,y16 |
| 06 | 05 | 0 | x21,y21 |
| 07 | 06 | 0 | x22,y22 |
| 08 | 07 | 1 | x23,y23 |
| 09 | 08 | 1 | x24,y24 |
| 0A | 09 | 1 | x25,y25 |
| | | | |

DISPLAY CONTROL WITH FEWER AMOUNTS OF DATA IN GAME SYSTEM

BACKGROUND OF THE INVENTION

1. Field of the Invention

The present invention relates to a display control technique in displaying desired characters and a background on a monitor of a game system to produce game images.

2. Related Art

There are known video game systems for performing virtual games such as a soccer game. In those video game systems, image data for expressing characters and backgrounds of games are prepared in advance and written in given memory regions of a storage of each game system. Under a game, the attitudes and positions of each character and regions to be displayed as a background are repeatedly computed at intervals, and, in response to the computed results for each interval, image data are selectively read out from the storage to form a one-frame game image to be depicted.

However, a game system has a limitation on the capacity of a storage of a game system, and in connection with this, there is another limitation on a size of a region allocated for storing the image data. Moreover, in competitive games such as a soccer game, it is required to display a plurality of characters in one-frame image at a time in most occasions. Additionally, to express motions of each character requires that each character has to be displayed in a different pose every frame. If different sets of image data correspondingly to different poses of the characters are prepared, the total amount of data that must be prepared beforehand becomes enormous. Under such circumstances, it may become impossible to perform the game in an entry-level game system, such as a portable game device, whose storage capacity is relatively smaller. If the characters are displayed at a constant pose with no motional expressions, it will be possible to reduce an amount of data, however, this way of display control produces only poor changes of game images, severely deteriorating attraction of games.

SUMMARY OF THE INVENTION

An object of the present invention is to provide a method of controlling a display of a game image, in which characters can be displayed in different poses by making full use of a storage region with limited capacity, a game system realizing the display control method, and a computer-readable recording medium storing software capable of realizing the display control method.

In order to achieve the above object, the present invention is configured as follows. In the following descriptions, for the sake of making it easier to understand the present invention, reference numerals adopted from the accompanying drawings are added to the major constituents with parentheses, but such constituents of the present invention are not necessarily limited to the exemplified ones.

According to one aspect of the present invention, there is provided a method of controlling a display of a game image (20), comprising the steps of: preparing both image data corresponding to each of a plurality of blocks (40 . . . 40) obtained by dividing a character to be displayed in the game image and further image data for representing a different picture in connection with at least part of the blocks; and changing a pose of the character displayed on the game image by switching a combination of the prepared image data.

Therefore, only switching image data corresponding to a part of a plurality of blocks composing one character into other image data enables the character to be displayed in another pose in a game image. Accordingly, in comparison with cases in which image data different for each pose of a character are prepared, an amount of image data necessary for displaying the character can be reduced.

In the above method, color of at least part of the character displayed in the game image based on the combination of the same image data may be changed to thereby represent a plurality of types of characters.

Thus, in comparison with cases in which image data are separately prepared for each character to which a different display color is assigned, amounts, of image data handled thorough display control can be lowered.

The color assigned to one of the blocks, which is mapped uppermost in the game image among the blocks constituting the character, may be kept unchanged regardless of changing of the color with respect to the remaining blocks.

When displaying characters such as human beings, animals, and robots in a game image, there are some cases where, of the blocks composing each of the characters, the uppermost mapped block is used for representing the head and the remaining blocks are used for representing portions including the body, hands, and feet. In such cases, simply switching the color of the blocks except the head block permits a game operator who plays a game to recognize this character as a different one. This color-switching processing can be easily done in this invention, and an amount of data handled in such processing can be reduced to relieve the burden of data processing.

According to another aspect of the present invention, there is provided a game system comprising: an image data storing device (4) for storing both image data corresponding to each of a plurality of blocks (40 . . . 40) obtained by dividing a character to be displayed in a game image (20) and further image data for changing a picture of at least one of the blocks; a character information producing device (1) for producing character information associated with a display pose of the character and a display position of the character in accordance with a progress of a game; a combination specifying device (1) for specifying image data from both said image data corresponding to the blocks and said further image data to display the character in the display pose corresponding to the character information and further specifying a mutual positional relationship between the blocks corresponding to the specified image data; and a display position determining device (1) for determining display positions in the game image with respect to the blocks corresponding to the image data specified by the combination specified device based on both the character information and the mutual positional relationship between the blocks specified by the combination specifying device.

Therefore, like the above method, since the image data stored in the image data storing device is configured such that only switching part of the image data composing one character into other image data enables the character to be displayed in another pose, a large number of poses of the character can be represented with fewer amounts of image data.

The above game system may further comprise a display performing device (1,5) for reading the image data specified by the combination specifying device (1) from the image data storing device (4) and for displaying images of the blocks (40. . . 40) corresponding to the read image data at the display positions in the game image (20) determined by the display position determining device.

In this case, image data specified depending on the character information are read from the image data storing device, and then displayed at the positions determined by the display position determining device.

The game system may further comprise a combination storing device (4) for storing both a plurality of display poses with respect to the character and combinations of image data necessary for displaying the character in said plurality of display poses so as to be associated with each other, and the combination specifying device (1) may specify the image data based on information stored in the combination storing device.

Therefore, based on the information stored in the combination storing device, the image data necessary for configuring the character to be displayed in a game image are easily specified.

The combination storing device (4) may store both said plurality of display poses and data designating mutual positional relationships of blocks (40 . . . 40) necessary for displaying the character at the plurality of display poses so as to be associated with each other, and the display position determining device (1) may determine the display positions of the blocks based on both the character information and the data designating the positional relationships, which are stored in the combination storing device (4).

In this case, it is possible to easily specify the display positions of the blocks composing the character designated by the character information.

The character information produced by the character information producing device (1) may include information for determining that the character belongs to which one of at least two types of attributions, and said game system may further comprise a color switching device for switching color of at least part of the character displayed in the game image based on a combination of the same image data in accordance with one of the attributions specified by the character information.

In the above configuration, the color of the character is in part exchanged in accordance with the attributions specified by the character information. Two or more types of characters, for example, like friend and opponent players, which should be distinguished from each other in a game image can be displayed using the same image data. Thus, an amount of the image data can be reduced noticeably, in comparison with cases where image data of characters are prepared for each attribute of the characters.

The color switching device may switch the color assigned only to the blocks except one of the blocks mapped uppermost in the game image among the blocks constituting the character.

In this case, simply switching the color of portions except the head of the character allows the character to be represented in a different attribution. Therefore, an amount of the data handled with the color switch can be lowered to relieve the burden on data calculation in the game system.

According to still another aspect of the present invention, there is provided a computer-readable recording medium (10) comprising: an image data storing region (10a) into which both image data corresponding to each of a plurality of blocks (40 . . . 40) obtained by dividing a character to be displayed in a game image (20) and further image data for changing a picture of at least one of the blocks are stored respectively; and a program storing region (10a) into which a program to be executed by a computer of a game system is stored, wherein the program is prepared to allow the computer to perform the steps of producing character information associated with a display pose and a display position of the character in accordance with a progress of a game, specifying image data from both said image data corresponding to the blocks and said further image data to display the character in the display pose corresponding to the character information and further specifying a mutual positional relationship of the blocks corresponding to the specified image data, and determining display positions in the game image with respect to the blocks corresponding to the specified image data based on both the character information and the specified mutual positional relationship of the blocks.

Utilizing this configuration, the computer is able to read and execute the program stored in the program storing region with referring to the image data stored in the image data storing region. This enables the game system to have the same or equivalent advantages as or to those described with respect to the above game system.

According to still another aspect of the present invention, there is provided a method of controlling a display of a game image (20) in which at least two types of characters (22a, 22b) defined as mutual opponents in a game are displayed in the game image so as to be mutually distinguishable in accordance with the types thereof, and poses of the characters are changed in accordance with a progress of the game, the method comprising the steps of: preparing both image data corresponding to each of a plurality of blocks (40 . . . 40) obtained by dividing one type of character (22a) among said at least two types of characters and further image data for changing a picture of at least one of the blocks; changing a pose of the one type of character displayed in the game image by switching a combination of the prepared image data; and representing other types of characters (22b) by changing at least part of color assigned to the one type of character composed by combining the image data.

Furthermore, there is provided a game system in which at least two types of characters (22a, 22b) defined as mutual opponents in a game are displayed in a game image (20) so as to be mutually distinguishable in accordance with the types thereof, and poses of the characters are changed in accordance with a progress of the game, the game system comprising: an image data storing device (4) for storing both image data corresponding to each of a plurality of blocks (40 . . . 40) obtained by dividing one type of character (22a) among the at least two types of characters and further image data for changing a picture of at least part of the blocks; a character information producing device (1) for producing character information associated with types, display poses, and display positions of all characters to be displayed in the game image according to the progress of the game; a combination specifying device (1) for specifying image data from both said image data corresponding to the blocks and said further image data to display the characters in the display poses corresponding to the character information and further specifying mutual positional relationships of the blocks corresponding to the specified image data; a display position determining device (1) for determining display positions in the game image with respect to the blocks corresponding to the specified image data based on both the character information and the specified mutual positional relationships of the blocks; and a color switching device (1) for switching color designation with respect to at least part of the blocks to be displayed in the game image in accordance with the types of the characters specified by the character information.

In the above method and game system, it is possible that a plurality of blocks combined for representing one type of character are in part replaced with other blocks. Such simple replacement allows the one type of character to alter in poses. Moreover, only switching part of the color of the one type of character can display other types of characters, and their display poses can be changed, like the one type of character. Thus, for each type of characters, the image data necessary for displaying the characters can greatly be reduced in amounts, in comparison with cases in which the image data are prepared separately for every pose.

According to still another aspect of the present invention, there is provided a computer-readable recording medium (10) for allowing a computer of a game system to perform processing by which at least two types of characters (22a, 22b) defined as mutual opponents in a game are displayed in a game image (20) so as to be mutually distinguishable in accordance with the types thereof and poses of the characters are changed in according with a progress of the game, the recording medium comprising: an image data storing region (10a) into which both image data corresponding to each of a plurality of blocks (40 . . . 40) obtained by dividing one type of character (22a) among the at least two types of characters and further image data for changing a picture of at least part of the blocks are stored respectively; and a program storing region (10a) into which a program to be executed by the computer is stored, wherein the program is prepared to allow the computer to perform the steps of producing character information associated with types, display poses, and display positions of all characters to be displayed in the game image according to the progress of the game, specifying image data from both said image data corresponding to the blocks and said further image data to display the characters in the display poses corresponding to the character information and further specifying mutual positional relationships of the blocks corresponding to the specified image data, determining display positions in the game image with respect to the blocks corresponding to the specified image data based on both the character information and the specified mutual positional relationships of the blocks, and switching color designation with respect to at least part of the blocks to be displayed in the game image in accordance with the types of the characters specified by the character information.

Utilizing this configuration, the computer is able to read and execute the program stored in the program storing region with referring the image data stored in the image data storing region. This can realize the above display control described in connection with the above method and the game system.

According to still another aspect of the present invention, there is provided a method of controlling a display of a game image (20), by which image data stored in a first image data storing device (30) of a game system are read in accordance with a progress of a game to thereby display a predetermined display range (51) of a background image (50) in the game image, the method comprising the steps of: storing further image data necessary for displaying the entire background image into a second image data storing device (10a) of the game system; dividing the further image data into a first data group corresponding to a central area (50C) of the background image and a plurality of second data groups each corresponding to each of separate peripheral areas (50R, 50L) of the background image, both the central area and the peripheral areas composing the entire background image; and fixedly storing image data of the first data group into the first image data storing device (30) and selectively storing image data of the plurality of second data groups into a specified area (33) of the first image data storing device when the background image is requested to be displayed.

This embodiment focuses on the fact that, when only part of a background image are displayed in the game image and its display range is shifted from the center of the background image toward one side of the peripheral areas in a certain direction, the image data corresponding to an opposite side of the peripheral areas are not used to represent the game image. Considering such occasion, the invention adopts a configuration where, of the image data composing the peripheral areas, only image data that used for representing the present game image or that show a higher possibility of being used in the near future are stored in the first image data storing device, while the image data corresponding to the opposite side of the peripheral areas are not stored in the first image data storing device. This configuration makes it possible to reduce a capacity of memory areas allotted to store the background image in the first image data storing device. Thus, in exchange of the reduction, the memory areas for mapping the image data of the character can be increased.

The above display control method may further comprise the step of mutually exchanging one of the second data groups stored into the first image data storing device (30) based on a positional relationship between a reference position placed in the background image (50) and the display range (51) to be displayed in the game image as the background image.

In this configuration, it is possible to make it accurate the correspondence between changes in the display range and exchanges of image data of the second data group toward the first image data storing device.

According to still another aspect of the present invention, there is provided a game system in which image data stored in a first image data storing device (30) are read in accordance with a progress of a game to thereby display a predetermined display range (51) of a background image (50) in a game image (20), the game system comprising: a second image data storing device (10a) for storing further image data necessary for displaying the entire background image; and a data storage controlling device (1) for dividing the further image data into a first data group corresponding to a central area (50C) of the background image and a plurality of second data groups each corresponding to each of separate peripheral areas (50R, 50L) of the background image, both the central area and the peripheral areas composing the entire background image, and for fixedly storing image data of the first data group into the first image data storing device and selectively storing image data of the plurality of second data groups into a specified area (33) of the first image data storing device when the background image is requested to be displayed.

In this embodiment, it is possible to reduce memory areas allotted to store the background image in the first image data storing device. Thus, in exchange of the reduction, memory areas for mapping the image data of the character can be increased.

The data storage control device (1) may be capable of mutually exchanging the second data groups stored into the first image data storing device (30) based on a positional relationship between a reference position placed in the background image and the display range of the background image in the game image.

In this embodiment, it is possible to make it accurate the correspondence between changes in the display range and exchanges of image data of the second data group toward the first image data storing members.

According to still another aspect of the present invention, there is provided a computer-readable recording medium

(10) in which a program is stored to allow a computer of a game system to perform processing for reading image data stored in a first image data storing device (30) of the game system in accordance with a progress of a game to thereby display a predetermined display range (51) of a background image (50) in a game image (20), the program being prepared to allow the computer to perform the steps of: dividing further image data, which are stored in a second image data storing device (10a) of the game system to display the entire background image, into a first data group corresponding to a central area (50C) of the background image and a plurality of second data groups each corresponding to each of separate peripheral areas (50R, 50L) of the background image, both the central area and the peripheral areas composing the entire background image; and fixedly storing image data of the first data group into the first image data storing device and selectively storing image data of the plurality of second data groups into a specified area (33) of the first image data storing device when the background image is requested to be displayed.

In this configuration, the computer can read and execute the program stored in the recording medium, which provides both the above mentioned display control method and the above game system.

The remaining features of the invention will be clearly understood from the following description of preferred embodiments and their modifications, described together with accompanying drawings.

BRIEF DESCRIPTION OF THE DRAWINGS

In the accompanying drawings:

FIG. 7 illustrates a data configuration stored in the RAM of the game system shown in FIG. 1 in order to specify the correspondence relationship between various types of characters and combinations of image data to express the characters;

FIGS. 12A and 12B are illustrations of data produced during performing processing according to the flowchart shown in FIG. 11.

DESCRIPTION OF THE PREFERRED EMBODIMENTS

Referring to FIGS. 1 to 12, one embodiment of the present invention will now be described. The embodiment is practiced into a game system capable of playing a soccer game.

Figure 1:
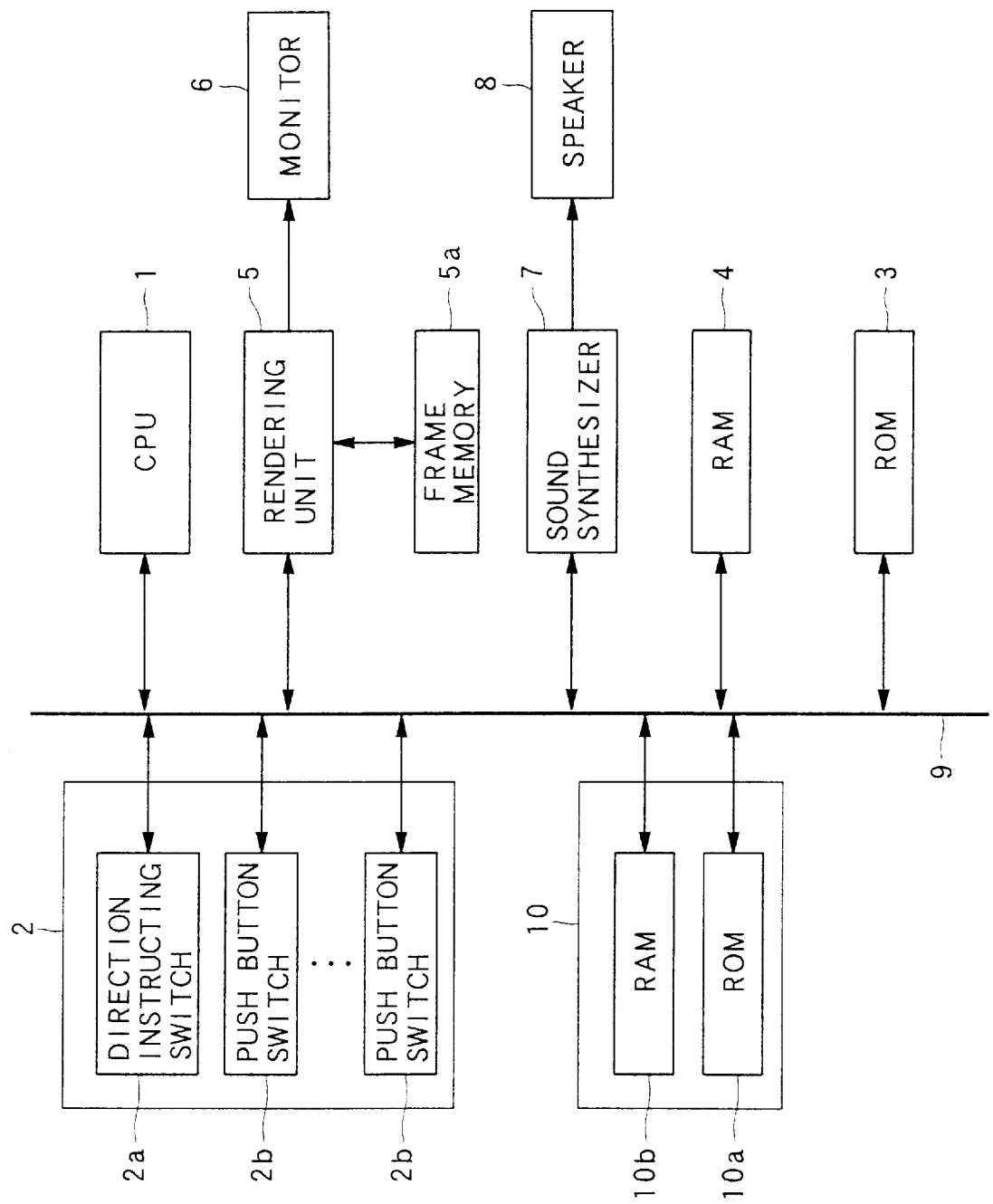
FIG. 1 is a block diagram showing a control system of a game system according to one embodiment of the present invention.

FIG. 1 is a block diagram showing a control system incorporated in the game system to which the present invention is applied. The game system has a CPU 1 mainly composed of a microcomputer and performing various types of calculation and others necessary for making a soccer game progress, an input device 2 providing the CPU 1 with signals formed correspondingly to player's operations, a ROM 3 into which programs and data are written for basic control operations such as the activation of the game system, a RAM 4 into which program and data required to make the game progress can be written at any time, a rendering unit 5 rendering desired image into a frame memory 5a according to instructions given by the CPU 1 and providing a monitor 6 with signals corresponding to the rendered images, and a sound synthesizer 7 to enable a speaker 8 to output desired sounds in response to commands from the CPU 1. The CPU 1 is electrically connected through a bus 9 with the input device 2, the ROM 3, the RAM 4, the rendering unit 5, and the sound synthesizer 7.

On the input device 2, there are provided a direction instructing switch 2a for instructing vertical or horizontal movement or any other motions of characters which appears on the monitor 6 and push button switches 2b . . . 2b of appropriate numbers. An external storing medium 10 is detachably connected to the bus 9. In the external storing medium 10, there are provided a ROM 10a into which program and data to be used for playing a game are memorized, and a RAM 10b into which data and other information produced during the game are preserved.

Figure 2:
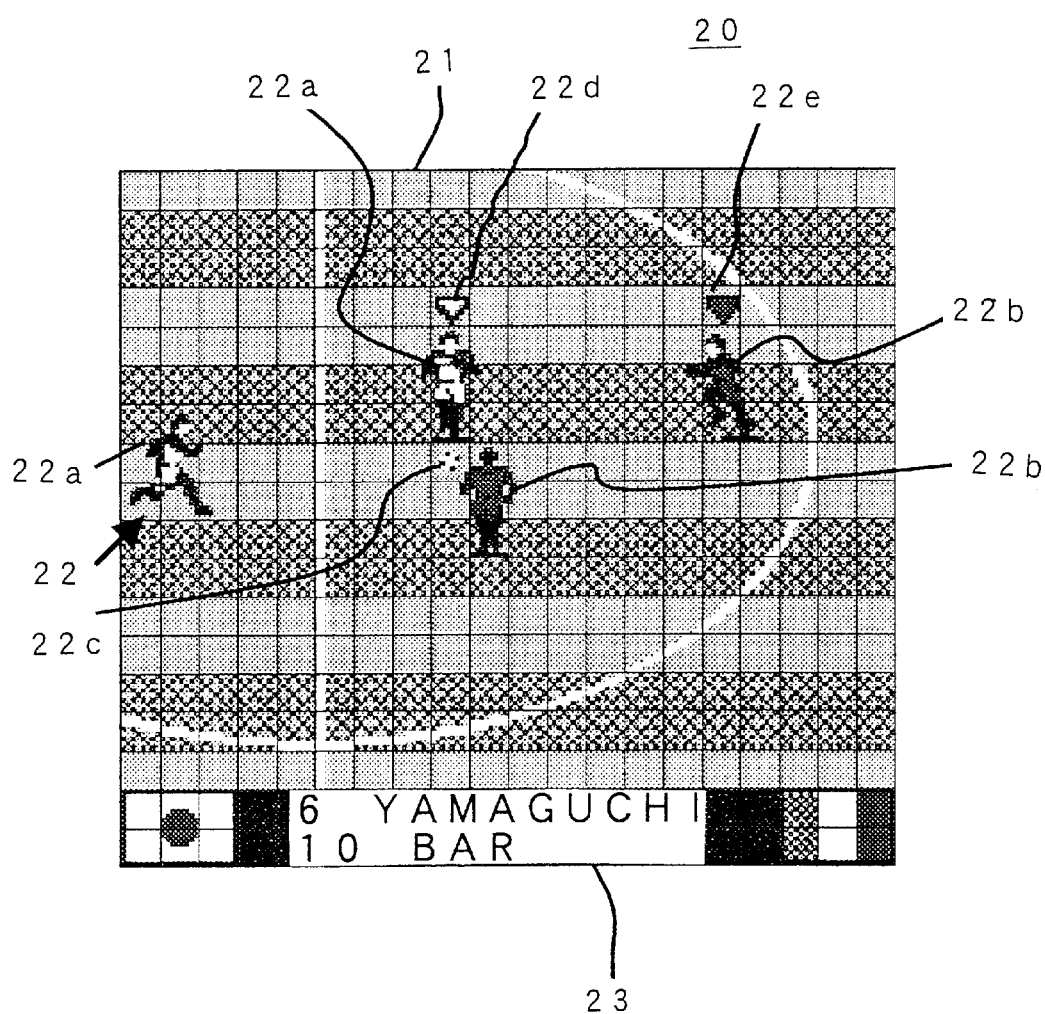
FIG. 2 is one example of game images displayed by the game system shown in FIG. 1.
Figure 3:
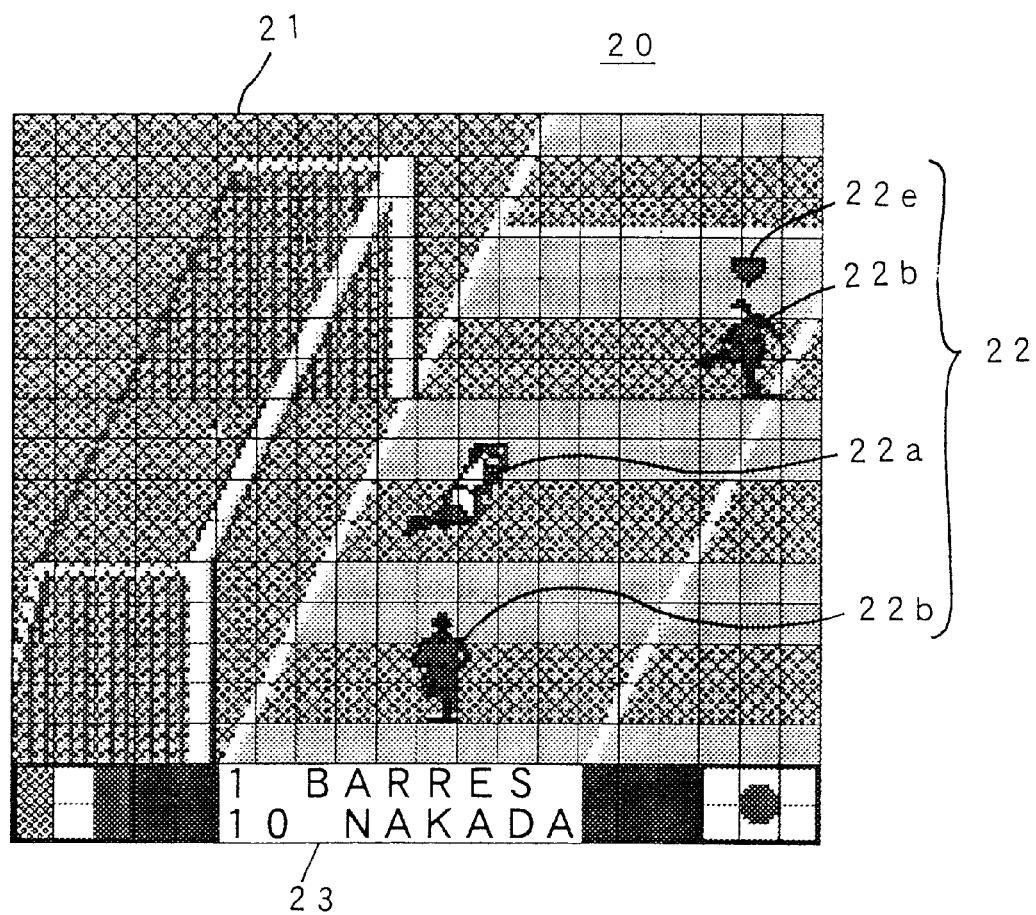
FIG. 3 is another example of game images displayed by the game system shown in FIG. 1.

FIGS. 2 and 3 show examples of game images (screens) of a soccer game performed based on the game program stored in the ROM 10a, respectively. As is apparent from these figures, each game image 20 contains a field image 21 expressing a field for the soccer game, character images 22 superposed, for display, on the field image 21, and an information image 23 displayed in a lower-end preset region on the game image 20. The character image 22 includes images 22a of players belonging to one team, who wear a light-color uniform, images 22b of players belonging to the other team, who wear a dark-color uniform, a image 22c of a ball, and images 22d and 22e of cursors indicating players selected as objects to be operated by a game operator (who plays the game). In the information image 23, the names of players pointed by the cursor images 22d and 22e, marks showing the teams that play the game, and other necessary information are displayed. The game images 20 shown in FIGS. 2 and 3 are displayed during playing the soccer game, while other images are displayed in activating the game, setting option items necessary for the game, selecting a team against which game operator's team competes, and performing other operations. Grid-like lines that can be seen on each game image 20 in FIGS. 2 and 3 represent the boundaries of blocks virtually constituting the field image 21, not expressed on the actual game image 20.

Figure 4:
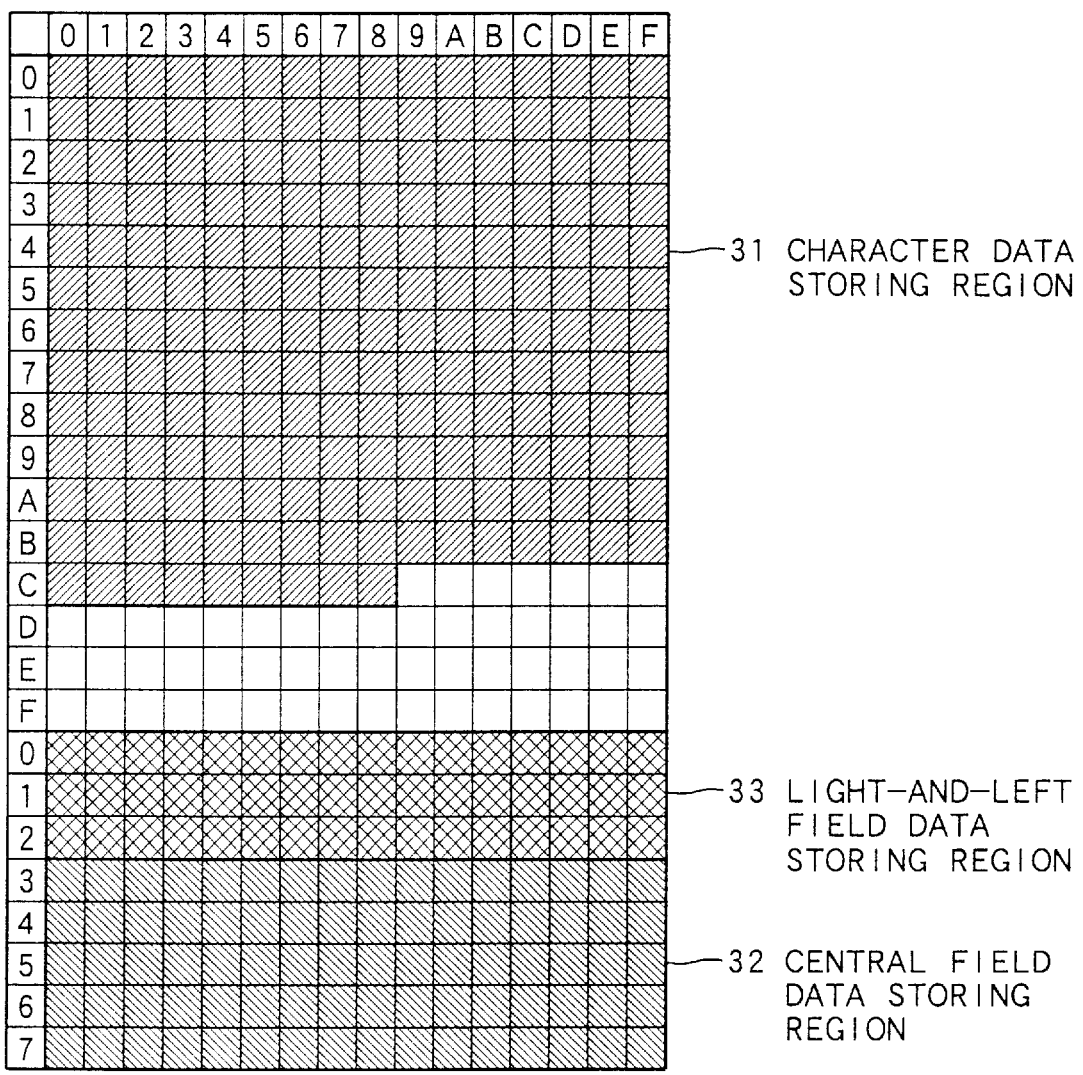
FIG. 4 shows the configuration of image data storing regions established in a RAM arranged in the game system shown in FIG. 1.

FIG. 4 shows the construction of an image data storing region 30 allotted in the RAM 4 during the play of a game. This storing region 30 is sectioned and managed by using addresses of 8-bits that consist of superior 4-digits shown by the column numbers 0 to F and inferior 4-digits shown by the row numbers 0 to F. These column and row numbers are expressed by the hexadecimal notation. The column numbers 0 to 7 are repeated, and the CPU 1 can recognize each repeated portion as a different region.

As seen from FIG. 4, in the image data storing region 30, there are allotted a character data storing region 31, a central field data storing region 32, and a right-and-left field data storing region 33. Image data expressing the foregoing character image 22 are stored in the character data storing region 31, whilst image data expressing the foregoing field image 21 are stored in the central and right-and-left field data storing regions 32 and 33. In other vacant regions, image data expressing the foregoing information image 23 are stored.

Figure 5:
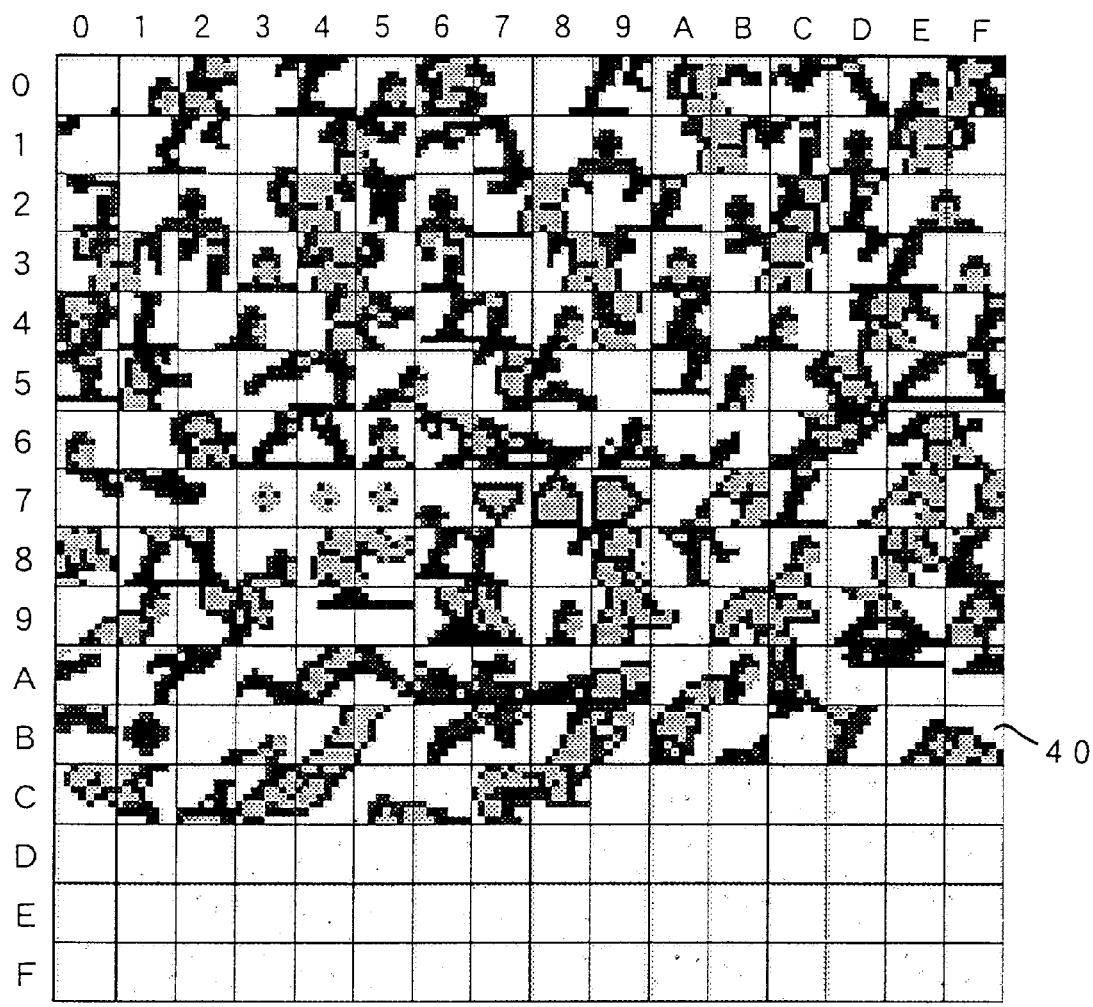
FIG. 5 shows in detail image data stored in a character data storing region illustrated in FIG. 4.
Figure 6:
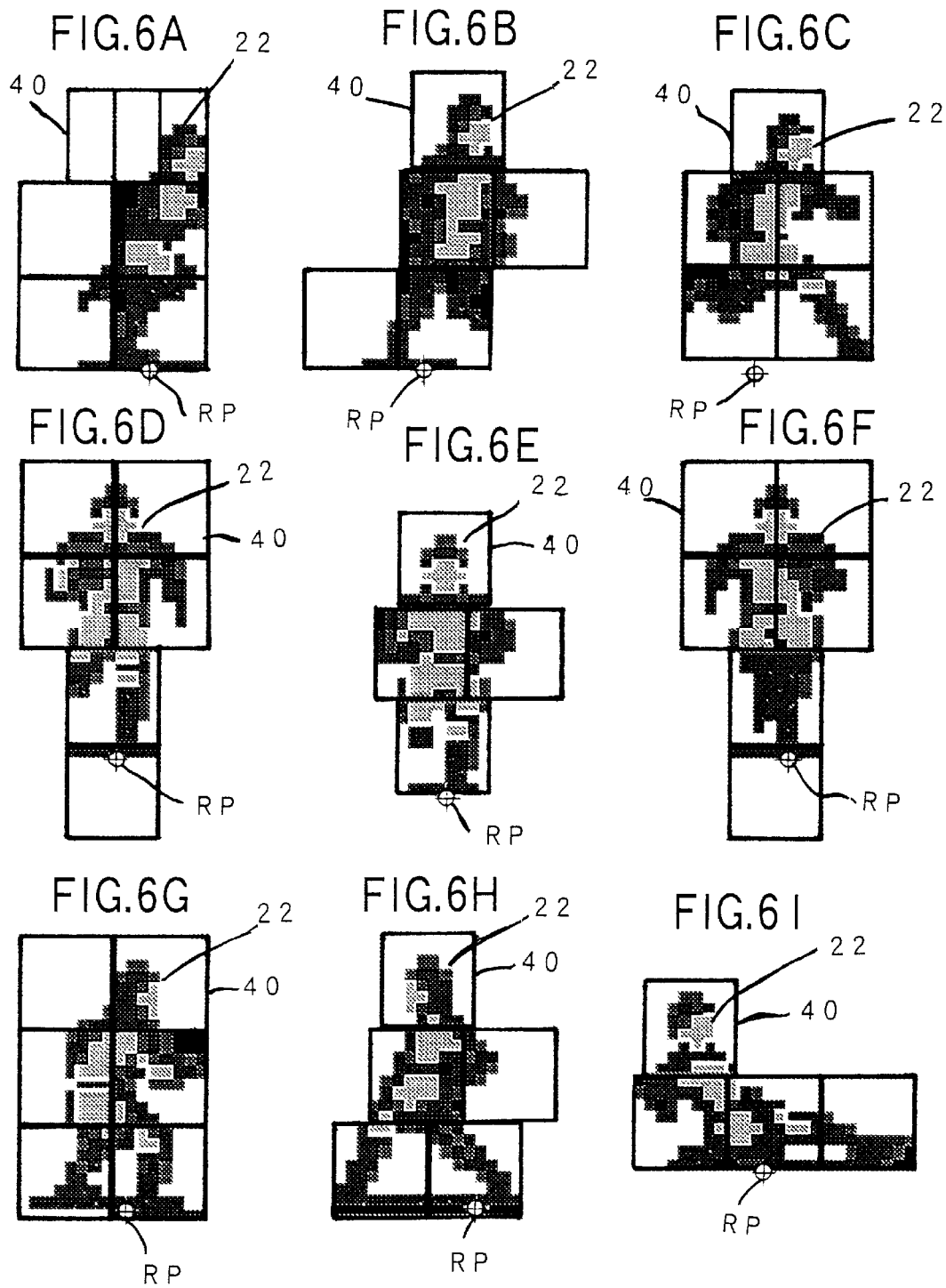
FIGS. 6A to 6I exemplify images of a character expressed by combining image data illustrated in FIG. 5.

FIG. 5 shows, in detail, image data stored in the character data storing region 31, where the column numbers 0 to F and the row numbers 0 to F correspond to the addressees in FIG. 4, respectively. Additionally, FIG. 6 shows various examples of the character image 22 that can be depicted using image data stored in the character data storing region 31. As understood from these figures, one character image 22 is constructed by combining a plurality of square blocks 40 . . . 40. Each block 40 is composed of a total of 64 pixels (i.e., 8 pixels in the longitudinal direction by 8 pixels in the lateral direction), and each pixel can be adjusted in four gradation steps. The image of each block is numerically determined to be stored at a different address of the character data storing region 31.

Stored in the character data storing region 31 are only image data that express the images 22a of players wearing the light-color uniform, the cursor image 22d indicating those players, and the image 22c of the ball. In other words, image data that express the images 22b of players who wear the dark-color uniform and the cursor image 22e indicating those players are not stored in the region 31. These images 22b and 22e are expressed, as described later, by changing the gradations of part of the pixels expressing the images 22a of light-color-uniform-worn players or its corresponding cursor image 22d.

In addition, in the case of this embodiment, merely replacing part of the blocks 40 . . . 40 constituting one character image 22 with other one or more blocks 40 makes it possible to express a different pose of character image 22. For example, images in FIGS. 6A to 6C show different momentary poses of a character who is running rightward, wherein the same block 40 is used as the heads between the two images 22 in FIGS. 6B and 6C. The same manner as above can be seen between FIGS. 6D and 6F, where the same block 40 is used in common for both the heads. In addition to the examples described above, appropriately combining blocks 40 allows a character to be expressed in a wide range of poses, other than ones exemplified in FIGS. 6A to 6I. Moreover blocks used in common are not restricted to ones to express the head. However, with respect to the blocks that constitute the player images 22a and 22b, the combinations of the blocks 40 are determined such that the uppermost positioned blocks 40 can always express the player's heads. The frame of each block 40 is not displayed on the actual game image 20. As a variation, the blocks 40 that constitute one character image 22 may be, in part, mapped in a superposition manner.

As described above, owing to the fact that only a replacement of part of the blocks 40 constituting one character image 22 makes it possible to express the character in a different pose, an amount of data that should be stored in the character data storing region 31 can be reduced in comparison with cases in which image data are differently prepared for each pose of a character.

FIG. 7 shows the configuration data previously made for specifying the relationships between the poses of each character shown in FIGS. 6A to 6I and the image data shown in FIG. 5. In the data, the character poses are coded with an appropriate number of bits. For example, codes are differentiated and assigned to each pose of the character, like the code "00" for the image 22 of FIG. 6A, "01" for that of FIG. 6B, "02" for that of FIG. 6C, and so on. And, both the addresses of the image data storing region 30, which are necessary for expressing characters in a pose designated by each code, and the coordinates showing the mapping of the blocks expressed by those image data are recorded in the condition that both of them are made to be associated with each other through the codes.

Figure 8:
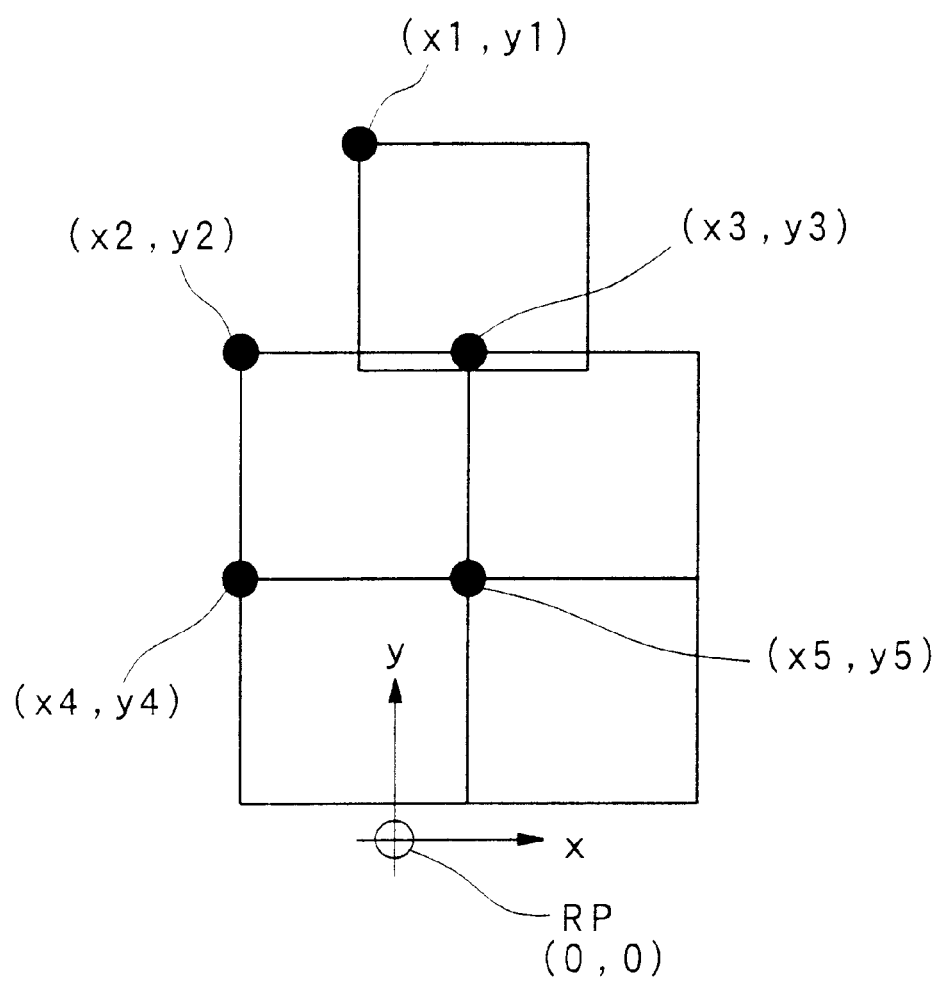
FIG. 8 is an illustration showing how to map coordinates constituting part of the data exemplified in FIG. 7.

For example, the pose (code 02) in FIG. 6C is constituted by combining five blocks 40 . . . 40 corresponding to image data stored at five addresses 05, 0A, 0B, 0C, and 0D of the storing region 30. Therefore, in the data shown in FIG. 7, there are recorded addresses 05, 0A, 0B, 0C, and 0D all correspondingly to the code "02" and coordinates (x1, y1), (x2, y2), (x3, y3), (x4, y4), and (x5, y5) showing the mapping of blocks 40 that correspond to image data stored at those addresses. Coordinate values specified here are values representing a predetermined point on each block 40 (for example, the upper left corner of each block 40), when it is supposed that a reference point RP is set for each character, as shown in FIGS. 6 and 8, and the x- and y-axes are set in the lateral and longitudinal directions with the reference point being employed as an origin. The reference point RP is used as a reference when each character is displayed on the game image 20, and usually set at the position of one of the feet or its vicinity.

Figure 9:
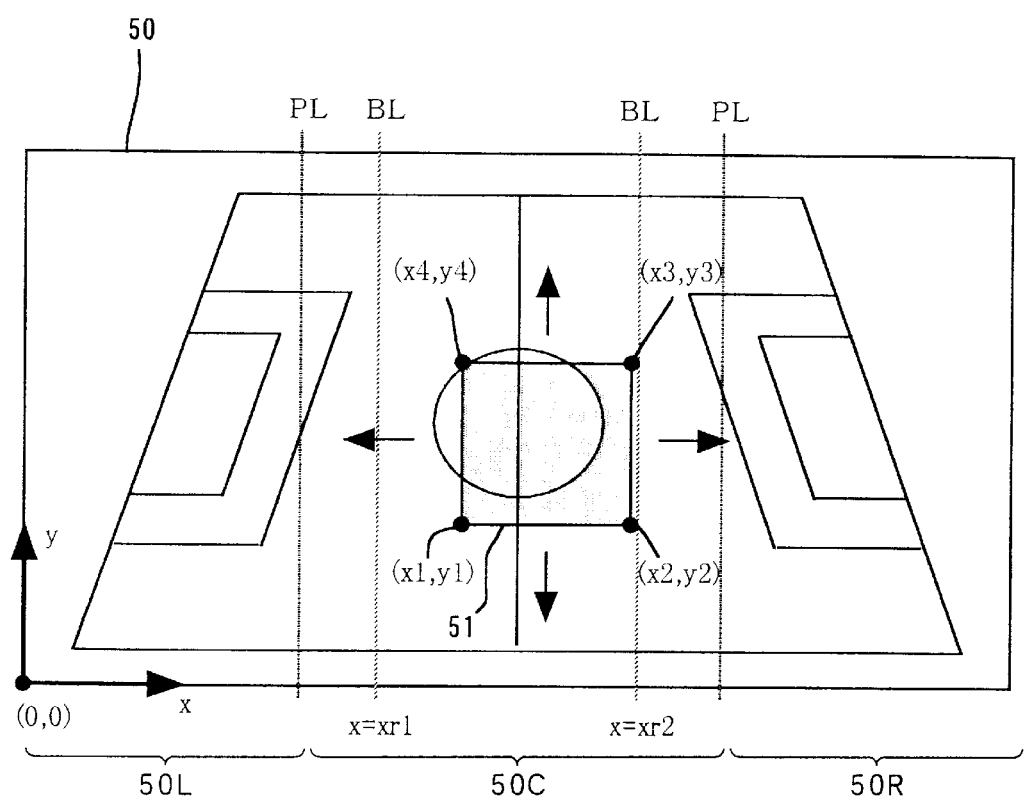
FIG. 9 is the whole view of a background image placed in the game images shown in FIGS. 2 and 3.

FIG. 9 shows an entire image of the background image 50 that can be displayed on the game image 20. During playing a game, the background image 50 is partially cut to produce a region 51, then the region 51 is displayed on the monitor 6 as the field image 21. The region 51 can be moved upward, downward, right, or left according to developments of a game, as pictorially shown by the arrows in the figure.

Figure 10A:
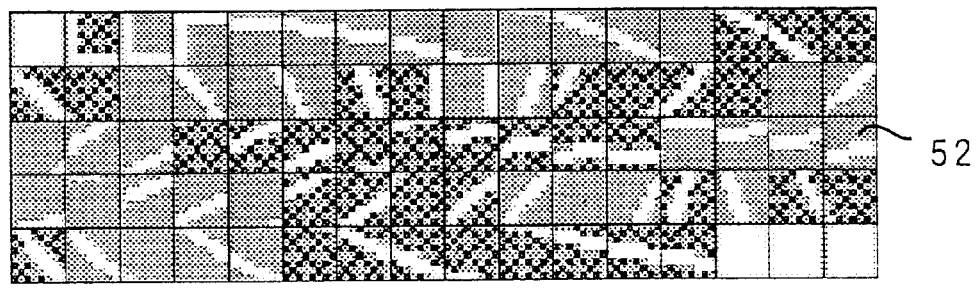
FIGS. 10A to 10C show in detail partial image data constituting the background image shown in FIG. 9.
Figure 10B:
Figure 10C:
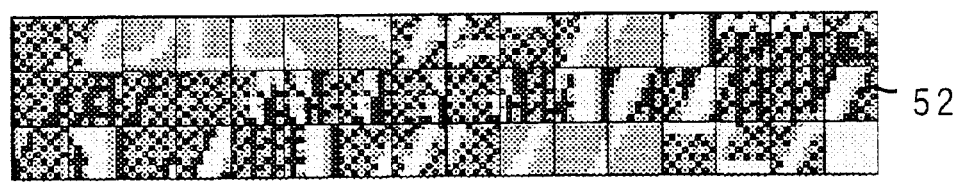

The background image 50 is sectioned into three regions 50C, 50R, and 50L by a pair of divisional lines PL and PL placed right and left on the image. Correspondingly to each of these three regions 50C, 50R, and 50L, three sets of image data shown in FIGS. 10A to 10C are produced previously. Of these sets of image data, a set of image data shown in FIG. 10A forms the first data group, while two sets of image data shown in FIGS. 10B and 10C form the second data group. Like the foregoing character data, these image data are divided into a plurality of blocks 52 . . . 52 and produced block by block. Each block 52 is made up of a total of 64 pixels, which is formed by 8 pixels in the longitudinal direction by 8 pixels in the lateral direction, in the similar way to each block 40 of characters. Additionally, each pixel can be expressed in four gradation steps.

Among the image data shown in FIGS. 10A to 10C, image data for displaying the central region 50C (FIG. 10A) are stored in the foregoing central field data storing region 32. Meanwhile, image data for displaying the right or left region 50R or 50L (FIG. 10B or 10C) are selectively stored in the foregoing right-and-left field data storing region 33, in conformity with developments of a game. The reason why such selective storage is done will now be described as follows.

As can be seen from FIG. 9, the region 51 to be displayed as the field image 21 is set to considerably be smaller in size than the regions 50C, 50R, and 50L. Therefore, when the region 51 is shifted to the right side of the background image 50, it is avoided that the image data residing in the left-side region 50L are not used to display the field image 21. To the contrary, when the region 51 is shifted to the left side of the background image 50, it is avoided that the image data residing in the right-side region 50R are not used to display the field image 21. That is, there is the relationship that, in cases either of the two sets of image data in the regions 50R and 50L are used, the other are not used. Nevertheless, when the image data in both regions 50L and 50R are stored in the storing region 30 at a time, the memories of the storing region 30 are occupied uselessly, reducing memory areas to memorize image data for displaying the character image 22 and information image 23. To overcome this drawback, depending on which position the region 51 takes within the background image 50, image data stored in the right-and-left field data storing region 33 are exchanged between the regions 50L and 50R, and then a remaining region produced after the data exchange is assigned to storing image data for displaying the character image 22 and the information image 23.

The image data, which are stored into the right-and-left field data storing region 33, are exchanged, for example, on the following conditions. Boundary lines BL and BL are defined at inner positions than the divisional lines PL and PL. The image data of both the regions 50R and 50L are exchanged by control so that, if the region 51 positions in the right area of the right-hand boundary line BL, the image data in the right-side region 50R are written in the right-and-left field data storing region 33, while if the region 51 positions in the left area of the left-hand boundary line BL, the image data in the left-side region 50L are written in the storing region 33. In cases the entire region 51 is within the inner area defined by the boundary lines BL and BL, the image data in either region 50R or 50L may be written in the right-and-left field data storing region 33.

The positional relationship between the region 51 and the boundary lines BL is determined, by way of example, by the following manner. As shown in FIG. 9, the origin is placed at a given position in the background image 50, for example, the left under corner thereof. And the x- and y-axes are set in the lateral and longitudinal directions, respectively. During the performance of the game, predetermined positions of the region 51, for example, the fore corner's coordinates (x1, y1), (x2, y2), (x3, y3), and (x4, y4), are repeatedly calculated depending on developments of the game. Image data contained in a rectangular region 51 defined by the calculated x- and y-coordinates are read from the storing region 30, and then displayed on the monitor 6 through the rendering unit 5. Then a minimum x1 (=x4) of the calculated x-coordinates is compared in value with an x-coordinate xr1 of the left-side boundary line BL. If the minimum x1 is smaller than the x-coordinate xr1, it is determined that the region 51 is in the left-side area of the left-side boundary line BL. Also a maximum x2(=x3) of the calculated x-coordinates of the region 51 undergoes the value comparison with an x-coordinate xr2 of the right-side boundary line BL. When the comparison result is that the maximum x2 is greater than the x-coordinate xr2, it is determined that the region 51 positions in the right-side area of the right-side boundary line BL.

Any data shown in each of FIGS. 5, 7, and 10A to 10C are written in the external storing medium 10 of the ROM 10a and provided to the game system. The CPU 1 performs activation processing written in the ROM 3, in response to operations of a not-shown power or reset switch, and then accesses the ROM 10a of the external storing medium 10 in order to load into the RAM 4 a game program and data which have been written in the ROM 10a. In this loading process, the image data shown in FIG. 5 are written into the character data storing region 31, the data shown in FIG. 10A are written into the central field data storing region 32, and the data shown in either FIG. 10B or FIG. 10C are written into the right-and-left field data storing region 33, respectively. The data shown in FIG. 7 are also written into a specified area of the RAM 4. Therefore, responding to operator's given operation toward the input device 2, a desired soccer game starts under the control of the loaded game program.

Figure 11:
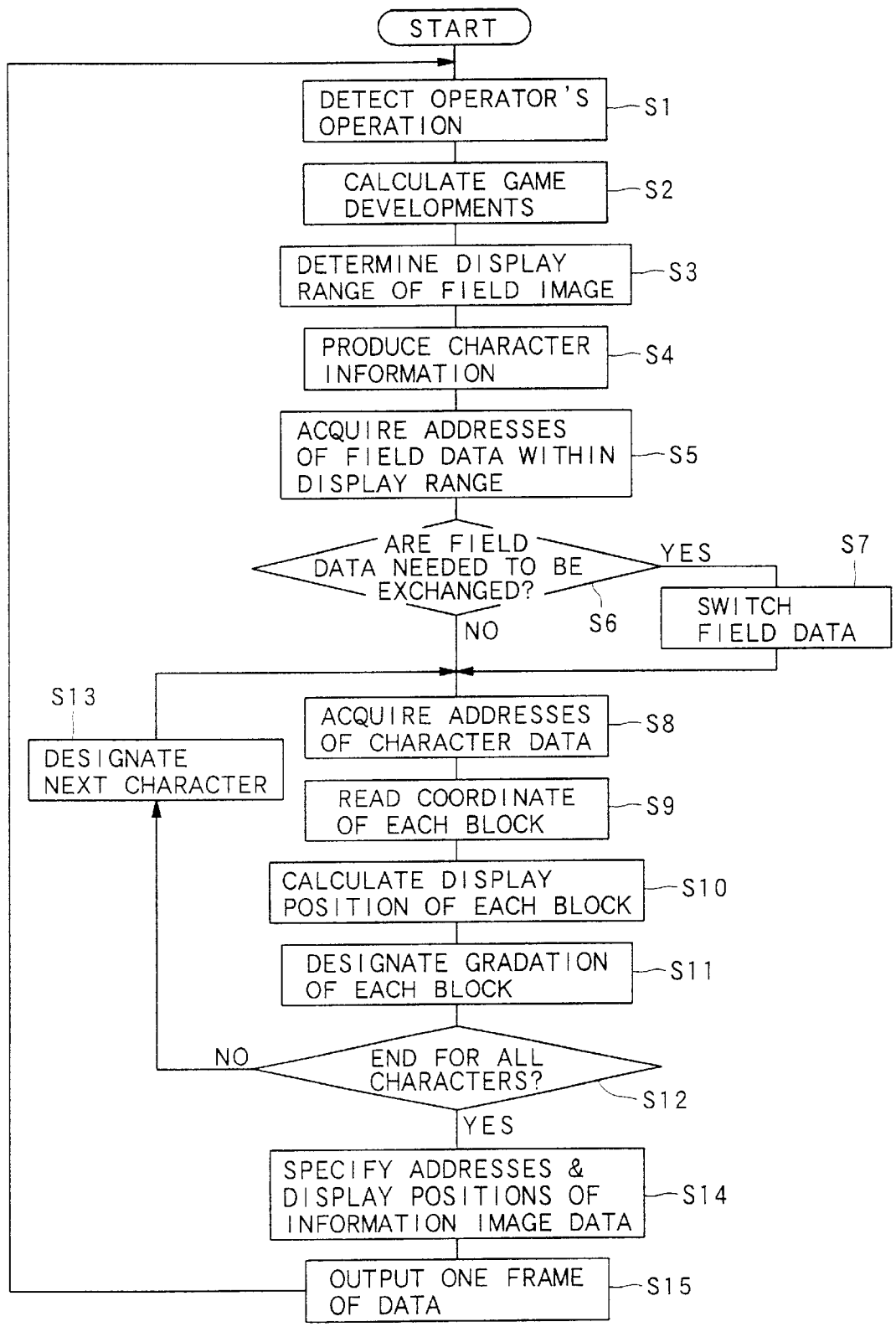
FIG. 11 is a flowchart expressing display control procedures of game images, which is performed by the CPU shown in FIG. 1.

FIG. 11 is a flowchart, which is executed by the CPU 1 that is responsible for various types of processing, representing a series of procedures of display control of game images produced repeatedly during the play of the soccer game. In FIG. 11, the image data for displaying the character image 221 are referred to as a term "character data," while the image data for displaying the field image 21 are referred to as another term "field data"; both the image data are distinguished from each other.

When the soccer game is commenced, first of all, the CPU 1 detects operator's operation using signals provided from the input device 2 (step S1). According to contents of the operation, predetermined calculations necessary for determining developments of the game, such as motions of soccer players and the soccer ball to be expressed in the next game image, are executed (step S2). This calculation can be done in the same way as known game systems perform games such as a soccer game.

Next, at step S3, a range of the field image 21 to be displayed on the next game image (screen) 20 is determined based on the calculated results at step S2. In other words, a position of the region 51 in the background image 50 shown in FIG. 9 is determined. Through this processing, for example, the region 51 is moved upward, downward, right or left according to a ball's position calculated at step S2, so that the ball is always displayed within a certain zone set in the central portion of the game image 20.

At step S4 which follows step S3, character information shown in FIG. 12A is formed based on results calculated at step S2 and the display range of the field image 21 determined at step S3. For all the characters to be displayed on the next game image 20, this character information is used for specifying poses, display positions, and whether gradations should be converted or not. The poses of characters are specified by utilizing the same codes as those shown in FIG. 7. The display positions of characters are represented by the coordinates of the reference point RP, as illustrated in each of FIGS. 6A to 6I, within the game image 20. Information as to conversion of gradations is incorporated into the date shown in FIG. 12A to identify whether or not each character can be expressed with gradations written in the storing region 30 without executing the conversion thereof. Specifically, this information is set to "1" for characters corresponding to either the images 22b of the players wearing the dark-color uniform or the cursor image 22e indicating those players, but to "0" for characters other than the above.

After forming the character information shown in FIG. 12A, addresses of the storing region 30, at which the image data included in the display range of the field image 21 determined at step S3 are written, are acquired, and the images stored at the addresses are determined in terms of their mapping order in the game image 20 in order to store those determined results into the RAM 4 (step S5). Then, with reference to the display range determined at step S3, it is determined whether or not the image data in the right-and-left field data storing region 33 are needed to be exchanged to each other (step S6). The criterion for this determination has been explained above with referring to FIG. 9. When the determination shows that the exchange is needed, the image data are exchanged as above (step S7), then proceeding to step S8. On the contrary, when the exchange is not needed, processing of step S7 is skipped, directly proceeding to step S8. It is not necessary that the exchange processing of the image data has to be completed by the start of processing at step S8; it is enough that such exchange processing has to be completed by the start of processing at step S15.

According to procedures after step S8, the data represented by FIG. 12B are produced. In these data, addresses of all character data necessary for composing the next game image 20, designation as to conversion of gradations for each address, and display coordinates of blocks 40 within the game image 20, which are expressed by the image data stored at the addresses, are recorded correspondingly one by one. These procedures for forming the data will now be described in turn.

First, at step S8, by retrieving the data in FIG. 7, addresses of the image data corresponding to all the blocks 40 composing any one character are acquired from character information shown in FIG. 12A, and the acquired addresses are memorized into the RAM 4 with the data numbers associated with the acquisition order as illustrated in FIG. 12B. In the example of FIG. 12B, data associated with the data numbers "00 to 05" correspond to a pose code "00" of the character number 1, and data associated with the data numbers "06 to 0A" correspond to a pose code "00" of the character number 2.

Then at step S9, coordinates corresponding to acquired addresses are obtained from the data in FIG. 7. Then at step S10, using both the obtained coordinates and the coordinates of display positions included in the character information in FIG. 12A, positions to be displayed on the game image 20 of all the blocks 40 composing one character are calculated. By way of example, since the data in FIG. 7 express the positions of each block 40 with the coordinate of the reference point RP regarding as (0, 0), an updated coordinate of each block 40 is calculated at step S10 in the state that the coordinate of the reference point RP is substituted into a coordinate specified by the character information. As represented in FIG. 12B, the coordinate obtained at step S10 is stored into the RAM 4 correspondingly to the address acquired at step S8.

At the next step S11, whether the conversion of gradations is required or not is specified for each block 40, on the basis of the designation as to the gradation conversion included in the character information shown in FIG. 12A and the coordinates given by the data in FIG. 7 or FIG. 12B. This designation is executed as follows. For characters to which "0" indicative of no conversion of gradations is specified in the character information in FIG. 12A, all the blocks 40 can be expressed by the image data stored in the storing region 30. Therefore, for all the blocks 40 composing the characters are set to "0" to define that there is no need for converting gradations. In contrast, characters to which "1" indicative of conversion of gradations is specified in the character information in FIG. 12A are required to convert gradations. Additionally, in the case that those characters correspond to the images of players who wear the dark-color uniform, blocks 40 other than one representing the head have to be converted in gradations. In such a case, y-coordinate values in FIG. 7 or FIG. 12B are compared to determine an uppermost block 40, that is, a block having the greatest y-coordinate, and "0" is set to its block 40, whilst "1" is set to the remaining blocks 40 in order to show that the conversion of gradations is required. In consequence, the conversion of the gradations is designated to the blocks composing character's remaining body portions except the head. For the character expressing the cursor image 22e, only one address is set. Therefore, utilizing this fact can make a distinction between the cursor image 22e and the player images 22b, so "1" may be set to cursor image character.

After completing the process at step S11, the processing proceeds to step S12, where it is determined whether or not the data shown in FIG. 12B have already been produced for all the characters specified by the character information. If there are remained one or more characters which are not yet processed, the next character number is selected and designated at step S13 as the next object to be processed, and then the process returns to step S8. Hereafter, until the data shown in FIG. 12B are produced for all the characters specified by the character information, the same processing as above will be repeated.

When the affirmative determination is done at step S12, the processing proceeds to step S14. At this step, based on the results calculated at step S2, addresses of all the image data composing the information image 23 to be displayed on the next game image 20 and display positions on the game image 20, at which the images stored at those addresses are displayed, are specified. Then, at step S15, by using the data obtained at steps S5, S8 to S13, and S14, a frame of image data required for displaying the next game image 20 are read from the storing region 30 to transfer them to the rendering unit 5.

Specifically, the image data required for depicting the field image 21 and the information image 23 are read from the storing region 30 based on the addressees specified at steps S5 and S13 in order to transfer the read image data to the rendering unit 5, and referring to the data in FIG. 12B, the image data stored in the character data storing region 31 are read in order to transfer the read image data to the rendering unit 5. In this processing, for the image data at the addresses at which the conversion of gradations are designated in the data shown in FIG. 12B, the gradations of their pixels that are made to match the light-color uniform are converted to a gradation that is made to match the dark-color one, then transferred to the rendering unit 5. Moreover, the data to specify the display positions of the individual image data are concurrently sent to the rendering unit 5. The rendering unit 5 renders the next game image 20 into the frame memory 5a on the basis of the image data and the data indicative of the display positions, both of which have been sent thereto, and then displays the rendered image 20 on the monitor 6 at a given timing.

After transferring the image data to the rendering unit 5, the CPU 1 returns its processing to step S1 to produce data of the next game image 20. Like this, the same routine processing is repeated until the soccer game is ordered to end.

In this embodiment, combining the CPU 1 and the software incorporated therein have realized the character information producing device (step S4), the combination specifying device (steps S8 and S9), the display position determining device (step S10), the color switching device (step S11 ), and the data storage controlling device (steps S6 and S7). Alternatively, these devices can be made up of, for example, logic circuits made by combined LSIs and ICs. Further, although the display performing means have been accomplished by combining the CPU 1 and rendering unit 5 in the above embodiment, an alternative configuration for this device may be obtained by the CPU 1 to directly represent images into the frame memory 5a; that is, the CPU 1 alone can constitute the display performing device.

In the foregoing embodiment, the RAM 4 serves as the image data storing device as well as the combination storing device; the ROM 10a serves as both the image data storing region and the program storing region; the image data storing region 30 serves as the first image data storing device; and the: ROM 10a serves as the second image data storing device. However, these assignments of constituents can be altered in various ways. For example, differently from the RAM 4, a video memory may be arranged to store therein the image data described in FIG. 4. Alternatively, without loading the image data shown in FIG. 7 from the ROM 10a to the RAM 4, it is available that addresses and coordinates are directly read from the data in the ROM 10a. In such a case, the ROM 10a is responsible for the combination storing device. Meanwhile, the game system of the present invention is not confined to ones that are designed for playing a soccer game but applied to other various games.

Moreover, in the above embodiment, the "poses" of the characters mean the appearances of the characters, but facial expressions and body sizes of the characters can be included into the poses. Additionally, as understood from the description of the embodiment, the technique by which gradations are altered between white and black is included into the color changes of the characters applied to the present invention.

As described above, according to this game system, each character to be displayed in the game image is divided into a plurality of blocks and the blocks are in part replaced with others. Performing only such block replacement allows the game system to display characters of distinguished poses. Thus, image data necessary for display of characters can be suppressed to fewer amounts, compared to occasions where image data are prepared independently for each character having a different pose. Because of this, even compact game systems whose memory regions available for image data storage are extremely limited in capacity are able to visualize different various poses of characters on their game systems. Thus, the game operators can enjoy playing games that show precise changes in character motions or others. Particularly, different types of characters, like friend and opponent characters, can be displayed by switching in part the color of the characters represented by using the same image data. In this case, an amount of image data can be reduced extremely, in comparison with cases where each character is displayed by individual image data.

Furthermore, in the game systems, an amount of data of a background image which occupy memory areas into which image data are to be stored can be reduced to a minimum, thereby allotting more memory areas to storing image data. As a result, even for simplified game systems of which memory areas available for image data storage are small and limited in capacity, a wide variety of poses of characters can be displayed in game images, thus game operators enjoying superior-quality images in which character's motions are finer.

Although the description above contains many specifications, these should not be construed as limiting the scope of the invention but as merely providing illustrations of some of the presently preferred embodiments of this invention. Thus the scope of this invention should be determined by the appended claims and their legal equivalents.

What is claimed is:

1. A method of controlling a display of a game image, comprising the steps of:

preparing both image data corresponding to each of a plurality of blocks obtained by dividing a character to be displayed in the game image and further image data for representing a different picture in connection with at least part of the blocks; and changing a pose of the character displayed on the game image by switching between a combination of part of the prepared image data and at least part of the prepared further image data;

producing character information associated with a display pose of the character and a display position of the character in accordance with a progress of a game;

specifying image data from both said image data corresponding to each of the plurality of blocks and said further image data to display the character in the display pose corresponding to the character information and further specifying a mutual positional relationship between the blocks corresponding to the specified image data; and determining display positions in the game image with respect to each of the blocks corresponding to the specified image data based on both the character information and the mutual positional relationship between the specified blocks, wherein the mutual positional relationship is specified by setting a reference point for the character and representing a predetermined point of each block by a coordinate obtained by employing the reference point as an origin;

in the character information, the display position of the character is represented by a coordinate of the reference point in the game image; and the display position of the block in the game image is obtained by calculating another coordinate of the predetermined point of each block in the state that the coordinate of the reference point as the origin is substituted into the coordinate of the display position of the character in the character information.

2. The method of claim 1, wherein color of at least part of the character displayed in the game image based on the combination of the same image data is changed to thereby represent a plurality of types of characters.

3. The method of claim 2, wherein color assigned to one of the blocks, which is mapped uppermost in the game image among the block constituting the character, remains unchanged regardless of changing of the color with respect to the remaining blocks.

4. The method of controlling a display of the game image according to claim 1, by which image data stored in a first image data storing device of a game system are read in accordance with a progress of a game to thereby display a predetermined display range of a background image in the game image, the method comprising the steps of:

storing further image data necessary for displaying the entire background image into a second image data storing device of the game system;

dividing the further image data into a first data group corresponding to a central area of the background image and a plurality of second data groups each corresponding to each of separate peripheral areas of the background image, both the central area and the peripheral areas composing the entire background image; and fixedly storing image data of the first data group into the first image data storing device and selectively storing image data of the plurality of second data groups into a specified area of the first image data storing device when the background image is requested to be displayed.

5. The display control method of claim 4, further comprising the step of mutually exchanging one of the second data groups stored into the first image data storing device based on a positional relationship between a reference position placed in the background image and the display range to be displayed in the game image as the background image.

6. A game system comprising:
an image data storing device for storing both image data corresponding to each of a plurality of blocks obtained by dividing a character to be displayed in a game image and further image data for changing a picture of at least one of the blocks;
a character information producing device for producing character information associated with a display pose of the character and a display position of the character in accordance with a progress of a game;
a combination specifying device for specifying image data from both said image data corresponding to the blocks corresponding to each of the plurality of blocks and said further image data for changing a picture of at least one of the blocks to display the character in the display pose corresponding to the character information and further specifying a mutual positional relationship between the blocks corresponding to the specified image data; and
a display position determining device for determining the display position in the game image with respect to each of the blocks corresponding to the image data specified by the combination specified device based on both the character information and the mutual positional relationship between the blocks specified by the combination specifying device,
wherein the mutual positional relationship is specified by setting a reference point for the character and representing a predetermined point of each block by a coordinate obtained by employing the reference point as an origin,
in the character information the display position of the character is represented by a coordinate of the reference point in the game image, and
the display position of the block in the game image is obtained by calculating another coordinate of the predetermined point of each block in the state that the coordinate of the reference point as the origin is substituted into the coordinate of the display position of the character in the character information.

7. The game system of claim 6, further comprising a display performing device for reading the image data specified by the combination specifying device from the image data storing device and for displaying images of the blocks corresponding to the read image data at the display positions in the game image determined by the display position determining device.

8. The game system of claim 6, further comprising a combination storing device for storing both a plurality of display poses with respect to the character and combinations of image data necessary for displaying the character in said plurality of display poses so as to be associated with each other,
wherein the combination specifying device specifies the image data based on information stored in the combination storing device.

9. The game system of claim 8, wherein the combination storing device stores both said plurality of display poses and data designating mutual positional relationships of blocks necessary for displaying the character at the plurality of display poses so as to be associated with each other, and
the display position determining device determines the display positions of the blocks based on both the character information and the data designating the positional relationships, which are stored in the combination storing device.

10. The game system of claim 6, wherein there are two or more types of characters to be distinguished in the game image, the character information produced by the character information producing device includes information for determining which one of the types the character belongs to, and
said game system further comprises a color switching device for switching color of at least part of the character displayed in the game image based on a combination of the same image data in accordance with one of the types specified by the character information.

11. The game system of claim 10, wherein the color switching device maintains color assigned to one of the blocks, which is mapped uppermost in the game image among the blocks constituting the character, unchanged, while switching the color assigned to the remaining blocks.

12. The game system according to claim 6 in which the image data stored in a first image data storing device are read in accordance with a progress of a game to thereby display a predetermined display range of a background image in a game image, the game system comprising:
a second image data storing device for storing further image data necessary for displaying the entire background image; and
a data storage controlling device for dividing the further image data into a first data group corresponding to a central area of the background image and a plurality of second data groups each corresponding to each of separate peripheral areas of the background image, both the central area and the peripheral areas composing the entire background image, and for fixedly storing image data of the first data group into the first image data storing device and selectively storing image data of the plurality of second data groups into a specified area of the first image data storing device when the background image is requested to be displayed.

13. The game system of claim 12, wherein the data storage control device is capable of mutually exchanging the second data groups stored into the first image data storing device based on a positional relationship between a reference position placed in the background image and the display range of the background image in the game image.

14. A computer-readable recording medium comprising:
an image data storing region into which both image data corresponding to each of a plurality of blocks obtained by dividing a character to be displayed in a game image and further image data for changing a picture of at least one of the blocks are stored respectively; and
program storing region into which a program to be executed by a computer of a game system is stored,
wherein the program is prepared to allow the computer to perform the steps of,
producing character information associated with a display pose and a display position of the character in accordance with a progress of a game,
specifying image data from both said image data corresponding to the blocks and said further image data for changing a picture of at least one of the blocks to display the character in the display pose corresponding to the character information and further specifying a mutual positional relationship of the blocks corresponding to the specified image data, and determining the display position in the game image with respect to each of the blocks corresponding to the image data specified by the specified combination based on both the character information and the mutual positional relationship between the specified blocks, wherein the mutual positional relationship is specified by setting a reference point for the character and representing a predetermined point of each block by a coordinate obtained by employing the reference point as an origin, in the character information, the display position of the character is represented by a coordinate of the reference point in the game image, and the display position of the block in the game image is obtained by calculating another coordinate of the predetermined point of each block in the state that the coordinate of the reference point as the origin is substituted into the coordinate of the display position of the character in the character information.

15. The computer-readable recording medium according to claim 10 in which the program is stored to allow the computer of the game system to perform processing for reading the image data stored in the first image data storing device of the game system in accordance with a progress of the game to thereby display a predetermined display range of a background image in a game image, the program being prepared to allow the computer to perform the steps of:

dividing further image data, which are stored in a second image data storing device of the game system to display the entire background image, into a first data group corresponding to a central area of the background image and a plurality of second data groups each corresponding to each of separate peripheral areas of the background image, both the central area and the peripheral areas composing the entire background image; and fixedly storing image data of the first data group into the first image data storing device and selectively storing image data of the plurality of second data groups into a specified area of the first image data storing device when the background image is requested to be displayed.

16. A method of controlling a display of a game image in which at least two types of characters defined as mutual opponents in a game are displayed in the game image so as to be mutually distinguishable in accordance with the types thereof, and poses of the characters are changed in accordance with a progress of the game, the method comprising the steps of:

preparing both image data corresponding to each of a plurality of blocks obtained by dividing one type of character among said at least two types of characters and further image data for changing a picture of at least one of the blocks;

producing character information associated with a type of the character to be displayed in the game image, a display pose of the character, and a display position of the character in accordance with a progress of a game;

specifying image data from both said image data corresponding to each of the plurality of blocks and said further image data to display the character in the display pose corresponding to the character information and further specifying a mutual positional relationship between the blocks corresponding to the specified image data; and determining the display positions in the game image with respect to each of the blocks corresponding to the specified image data based on both the character information and the mutual positional relationship between the specified blocks, representing other types of characters by changing at least part of color assigned to the one type of character composed by combining the image data, wherein the mutual positional relationship is specified by setting a reference point for the character and representing a predetermined point of each block by a coordinate obtained by employing the reference point as an origin;

in the character information, the display position of the character is represented by a coordinate of the reference point in the game image; and the display position of the block in the game image is obtained by calculating another coordinate of the predetermined point of each block in the state that the coordinate of the reference point as the origin is substituted into the coordinate of the display position of the character in the character information.

17. A game system in which at least two types of characters defined as mutual opponents in a game are displayed in a game image so as to be mutually distinguishable in accordance with the types thereof, and poses of the characters are changed in accordance with a progress of the game, the game system comprising:

an image data storing device for storing both image data corresponding to each of a plurality of blocks obtained by dividing one type of character among the at least two types of characters and further image data for changing a picture of at least part of the blocks;

a character information producing device for producing character information associated with types, display poses, and display positions of all characters to be displayed in the game image according to the progress of the game;

a combination specifying device for specifying image data from both said image data corresponding to the blocks and said further data to display the characters in the display poses corresponding to the character information and further specifying mutual positional relationships of the blocks corresponding to the specified image data;

a display position determining device for determining display positions in the game image with respect to the blocks corresponding to the specified image data based on both the character information and the specified mutual positional relationships of the blocks; and a color switching device for switching color designation with respect to at least part of the blocks to be displayed in the game image in accordance with the types of the characters specified by the character information, wherein the mutual positional relationship is specified by setting a reference point for the character and representing a predetermined point of each block by a coordinate obtained by employing the reference point as an origin;

in the character information, the display position of the character is represented by a coordinate of the reference point in the game image; and the display position of the block in the game image is obtained by calculating another coordinate of the predetermined point of each block in the state that the coordinate of the reference point as the origin is substituted into the coordinate of the display position of the character in the character information.

18. A computer-readable recording medium for allowing a computer of a game system to perform processing by which at least two types of characters defined as mutual opponents in a game are displayed in a game image so as to be mutually distinguishable in accordance with the types thereof and poses of the characters are changed in according with a progress of the game, the recording medium comprising:

an image data storing region into which both image data corresponding to each of a plurality of blocks obtained by dividing one type of character among the at least two types of characters and further image data for changing a picture of at least part of the blocks are stored respectively; and a program storing region into which a program to be executed by the computer is stored, wherein the program is prepared to allow the computer to perform the steps of, producing character information associated with types, display poses, and display positions of all characters to be displayed in the game image according to the progress of the game, specifying image data from both said image data corresponding to the blocks and said further image data to display the characters in the display poses corresponding to the character information and further specifying mutual positional relationships of the blocks corresponding to the specified image data, determining display positions in the game image with respect to the blocks corresponding to the specified image data based on both the character information and the specified mutual positional relationships of the blocks, and switching color designation with respect to at least part of the blocks to be displayed in the game image in accordance with the types of the characters specified by the character information, wherein the mutual positional relationship is specified by setting a reference point for the character and representing a predetermined point of each block by a coordinate obtained by employing the reference point as an origin;

in the character information, the display position of the character is represented by a coordinate of the reference point in the game image; and the display position of the block in the game image is obtained by calculating another coordinate of the redetermined point of each block in the state that the coordinate of the reference point as the origin is substituted into the coordinate of the display position of the character in the character information.

* * * * *